(12) United States Patent
Saez et al.

(10) Patent No.: US 7,922,132 B2
(45) Date of Patent: Apr. 12, 2011

(54) ACCESSORY HOLDER

(75) Inventors: Manuel Saez, Brooklyn, NY (US);
Bradley Augustine, Brooklyn, NY (US);
Aaron Tsui, Brooklyn, NY (US);
Lachezar Tsvetanov, Stamford, CT (US)

(73) Assignee: Humanscale Corporation, New York, NY (US)

( * ) Notice: Subject to any disclaimer, the term of this patent is extended or adjusted under 35 U.S.C. 154(b) by 581 days.

(21) Appl. No.: 11/626,553

(22) Filed: Jan. 24, 2007

(65) Prior Publication Data
US 2008/0173774 A1 Jul. 24, 2008

(51) Int. Cl.
*A47F 5/00* (2006.01)
*A47F 7/00* (2006.01)
*F16M 11/00* (2006.01)
*F16M 13/00* (2006.01)

(52) U.S. Cl. .................. 248/124.1; 248/371; 248/276.1; 248/917; 248/920; 361/679.04

(58) Field of Classification Search .................. 248/917, 248/333, 183, 178, 149, 162.1, 280.1, 123.1, 248/371, 631, 276, 184, 124.1; 361/681, 361/679.04; 345/161; 312/251
See application file for complete search history.

(56) References Cited

U.S. PATENT DOCUMENTS

| | | | |
|---|---|---|---|
| 661,645 A | 11/1900 | Rogers | |
| 3,848,870 A | 11/1974 | Craig | |
| 4,348,009 A | 9/1982 | Chapman | |
| 4,548,378 A | 10/1985 | Worrallo | |
| 4,690,362 A * | 9/1987 | Helgeland | 248/404 |
| 5,680,820 A | 10/1997 | Randolph | |
| 5,687,939 A * | 11/1997 | Moscovitch | 248/122.1 |
| 5,904,328 A | 5/1999 | Leveridge et al. | |
| 6,343,006 B1 | 1/2002 | Moscovitch et al. | |
| 6,381,125 B1 | 4/2002 | Mizoguchi et al. | |
| 6,554,238 B1 * | 4/2003 | Hibberd | 248/278.1 |
| 6,695,270 B1 * | 2/2004 | Smed | 248/274.1 |
| 7,036,798 B1 | 5/2006 | Olson | |
| 7,061,754 B2 * | 6/2006 | Moscovitch | 361/679.21 |
| 7,066,435 B2 * | 6/2006 | Oddsen et al. | 248/220.43 |
| 7,168,665 B2 | 1/2007 | Hong et al. | |
| 7,195,214 B2 | 3/2007 | Lee et al. | |
| 7,369,401 B1 * | 5/2008 | Floersch et al. | 361/679.27 |
| 7,516,924 B2 | 4/2009 | White et al. | |

(Continued)

FOREIGN PATENT DOCUMENTS

WO 2008/091998 A2 7/2008

(Continued)

OTHER PUBLICATIONS

Ergo in Demand—Flat Panel Monitor Arms—Pivot Mount for Two, Three, or four Screens, [online] Nov. 18, 2006.

(Continued)

*Primary Examiner* — Terrell Mckinnon
*Assistant Examiner* — Michael McDuffie
(74) *Attorney, Agent, or Firm* — Jones, Walker, Waechter, Poitevent, Carrere & Denegre, L.L.P.

(57) ABSTRACT

The present invention is directed to an accessory holder capable of supporting a plurality of accessories and positioning those accessories in three-dimensions. A preferred embodiment supports the accessories in a curvilinear shape that optimizes the viewing position by the user. The accessories include flat panel displays, touch screens, telephones, and other devices used in an office or home office environment.

37 Claims, 7 Drawing Sheets

U.S. PATENT DOCUMENTS

| | | | |
|---|---|---|---|
| 7,529,083 B2 * | 5/2009 | Jeong | 248/917 |
| 7,621,500 B2 | 11/2009 | Ishizaki et al. | |
| 7,623,342 B2 * | 11/2009 | Ozolins et al. | 361/679.06 |
| 7,733,634 B2 | 6/2010 | Sano et al. | |
| 2002/0194792 A1 * | 12/2002 | Feldpausch et al. | 52/36.1 |
| 2003/0001057 A1 | 1/2003 | Sweere et al. | |
| 2004/0004165 A1 * | 1/2004 | Hong et al. | 248/132 |
| 2004/0011938 A1 | 1/2004 | Oddsen, Jr. | |
| 2006/0065795 A1 | 3/2006 | Blackburn | |
| 2006/0238967 A1 * | 10/2006 | Carson et al. | 361/681 |
| 2007/0097609 A1 * | 5/2007 | Moscovitch | 361/681 |
| 2007/0138356 A1 | 6/2007 | Johansson et al. | |
| 2007/0176060 A1 | 8/2007 | White et al. | |
| 2007/0205340 A1 * | 9/2007 | Jung | 248/125.9 |
| 2008/0117578 A1 * | 5/2008 | Moscovitch | 361/681 |
| 2008/0225472 A1 | 9/2008 | Chih | |

FOREIGN PATENT DOCUMENTS

| | | |
|---|---|---|
| WO | 2008/091998 A3 | 7/2008 |

OTHER PUBLICATIONS

Ergo in Demand—Installation Instructions—Product #300-500-22, 30-500-33, 30-500-44 [online] Nov. 18, 2006.

PCT/US2008/051905—US as the International Searching Authority—Written Opinion dated Aug. 7, 2008.

* cited by examiner

ACCESSORY HOLDER

FIELD OF THE INVENTION

The present invention is generally directed to mechanisms useful for facilitating the support and positional adjustment of an attached device. More particularly, the invention provides a position adjustable accessory holder for use with an input device or a display device, such as a video display. The accessory holder allows for easy three-dimensional adjustment of a device to place the device in a position more ergonomically desirable for a user.

BACKGROUND

As more individuals spend an increasing amount of time using computers, computer users are sitting at desks or workstations in front of input/output devices such as video displays for longer periods of time. This time encompasses performing activities that include inputting data, viewing video display, and otherwise interacting with digital media.

The increasing amount of time associated with such activity has been associated with various health problems. These problems include muscle strain, fatigue, and stress caused by improper posture. According to experts in ergonomics, though, there are several easy and effective ways in which computer users can improve their physical comfort, fight fatigue, and reduce the risk of injuries from repetitive motions.

Posture is one area in which minor adjustments can quickly yield benefits. At home, but especially in a more stressful environment, like an office, users may force their bodies into rigid positions that result in fatigue, muscle strain, and, potentially, injury. Maintaining what experts refer to as optimal ergonomic positioning can increase energy levels and improve overall comfort. Good posture keeps the spine in what health professionals call the neutral position. Achieving a neutral posture while seated upright in a chair with good lumbar support entails lifting the rib cage away from the hips, tucking in the stomach, pulling the shoulders back, centering the weight of the head atop the spine, and maintaining the lower back in a gentle C-shaped curve. Sustaining this position can help reduce muscle strain and relieve pressure on the lower back.

Beyond spinal posture, optimal ergonomic positioning requires tailoring the work area to fit the user's needs. Among things necessary to accomplish that is to position video displays in appropriate positions. Having the video displays in proper positions reduces muscle strain caused by the weight of the head leaning too far backward or forward.

The prior art discloses multiple methods for positioning video displays. U.S. Pat. No. 6,149,253 discloses a system comprising a display platform supported on a frame with a lift actuator, the display platform having a swivel base, a swivel actuator, a tilt actuator, and a display table. Systems such as this, while functional, are inefficient and bulky. Further, such systems are limited to use with larger displays, such as conventional computer monitors and conventional CRT television sets.

The present state of the art in video display has an emphasis on flat screen designs. This conforms to the market demand for higher performance, less space consumption, and a more streamlined appearance. To meet this demand, it is becoming common to have flat screen video displays attached to a work area with some manner of display arm. These prior art display arms cannot hold a plurality of video displays and consequently are not able to keep a plurality of videos displays in optimal position. In other embodiments, a plurality of display arms may be supported but they are not maintained in optimal positions and result in discomfort to the user. Furthermore, the daily needs of individual users can also change. To be ergonomically beneficial, a video display should be capable of three-dimensional adjustment to a most comfortable position. None of the prior art systems can support numerous accessories in optimal positions and be adjusted in three dimensions.

SUMMARY OF THE INVENTION

The invention is an accessory holder comprising a support means, a track attached to the support means, at least one support attachment bracket slidably attached to the track, and at least one accessory mounting bracket attached to the at least one support attachment bracket. The track can be straight or curvilinear and the accessory mounting bracket may be adapted to be removably attached to an accessory. The support means may include a mounting means, a vertical support attached to the mounting means, a height adjustment means operatively engaged to the vertical support, and a track support means connected to the height adjustment means, the track support means may be adapted to be attached to a track. The height adjustment means may comprise a height controller, an arm extending from the vertical support to a distal end. The arm's height may be controlled by the height controller and the arm may be rotatably attached to the vertical support. The distal end of the arm may be rotatably attached to the track support means. The arm may comprise a sleeve surrounding the vertical support, wherein the sleeve may be capable of rotating around the vertical support and may be operably engaged to the height controller, an upper post extending substantially horizontally from the sleeve to a distal end, and a lower post extending from the sleeve at an upward angle to an intersection with the upper post. The track may include a central track attached to the track support means and at least one wing track pivotally attached to a distal end of the central track. The invention may also include a second row of accessories. In this embodiment, the track support means may further comprise an upper vertical shaft having a distal end and a proximal end so that the proximal end of the upper vertical shaft may be attached to the distal end of the arm. An upper sleeve may then be rotatably attached to the distal end of the upper vertical shaft and an upper track may be attached to the upper sleeve.

In another embodiment, the height controller may comprise a gear rack attached to the vertical support, at least one gear operatively engaged with the gear rack, and a handle attached to the at least one gear, wherein rotating the handle rotates the at least one gear. Alternatively, a motor may be attached to the at least one gear, wherein rotating the motor rotates the at least one gear.

In an alternative embodiment using a gas cylinder, the height controller may comprise a housing supporting a gear rack along its length, a skate slidably attached to the housing, at least one gas cylinder attached to the skate, at least one gas cylinder actuator attached to the at least one gas cylinder, a gear box, which is attached to the skate, having at least one gear operatively engaged to the gear rack, and a knob attached to the at least one gear. In this embodiment, the accessory holder's height is adjusted upward by actuating the gas cylinder thereby causing the gas cylinder to exert an upward force on the accessory holder and support a portion of the weight making it easier for a user to rotate a gear and move the accessory holder upward.

The mounting means may be mounted to a wall using a plate through which mechanical fasteners can be inserted into a wall. In an alternative embodiment, the mounting means may be desk mounted. The desk mount may comprise a receiving member attached to a desk and adapted to receive a connecting member and a connecting member attached to the height adjustment means. In another embodiment, the accessory holder may be mounted to a wall track. The mounting means may comprise a mounting plate attached to the vertical support and a wall track attached to a wall, wherein the wall track may be adapted to be removably attached to the mounting plate.

In a preferred embodiment, the track is shaped so that each of the accessories is positioned equidistant from a user. In a further preferred embodiment, the track is shaped so that each of the accessories is positioned to face a user.

In an alternative embodiment, the accessory holder may comprise a mount attached to a structure, a base attached to the mount, a substantially circular cylinder attached to the base at a proximal end, a gear rack along the vertical length of the substantially circular cylinder, a hand crank housing movably attached to the substantially circular cylinder, a gear movably attached to the hand crank housing and operably engaged with the gear rack, a handle or motor attached to the gear, an offset arm arm extending from the substantially circular cylinder and movably attached at a proximal end to the substantially circular cylinder and attached to the hand crank housing, a central track rotatably attached to the distal end of the offset arm, at least one wing track pivotally attached to a distal end of the central track, at least one glider slidably attached to a track, and at least one accessory mounting bracket movably attached to the at least one support attachment bracket, wherein the accessory mounting bracket may be adapted to be removably attached to an accessory.

The above summary of the present invention is not intended to describe each illustrated embodiment or every possible implementation of the present invention. The figures and the detailed description which follow, however, do particularly exemplify these embodiments.

BRIEF DESCRIPTION OF THE DRAWINGS

For purposes of illustrating the invention, there is shown in the drawings forms, which are presently preferred. It is understood, however, that the invention is not limited to the precise arrangement and instrumentalities shown.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides an accessory holder generally useful for facilitating positional adjustment and support of a variety of attached devices. The inventive mechanisms are particularly useful for positional adjustment and support of different devices associated with electronic media input and output. In one embodiment, a display device, such as a video display (e.g., a flat-screen monitor), can be attached to the inventive accessory holder. In further embodiments, input devices, such as a touch screen, can be attached to the accessory holder. Further, the accessory holders are useful for attachment thereto of a support, such as for supporting a computer keyboard, a laptop computer, a personal DVD player, document holder, or other input, display, or combination device.

Figure 6:
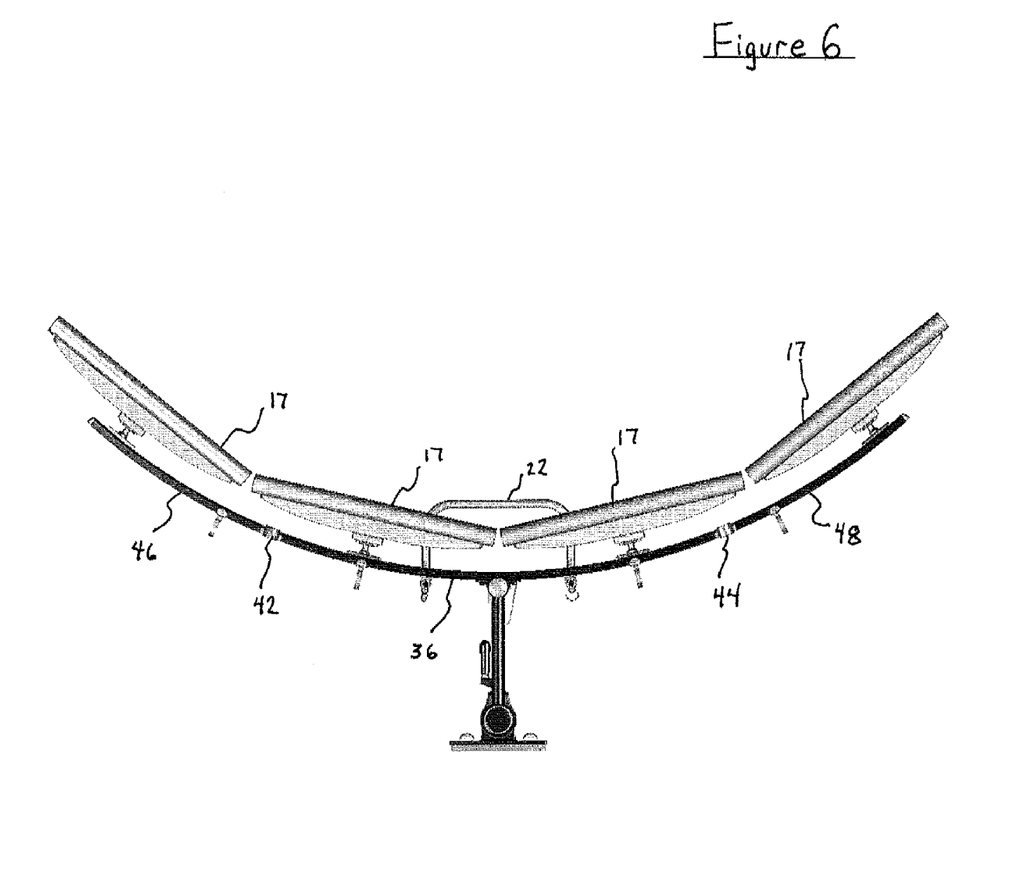
FIG. 6 is a top view of an embodiment of the invention.

For simplicity, the invention will be described in terms of allowing for positional adjustment and support of a plurality of flat screen monitors 17 (see FIG. 6). Accordingly, any description of the accessory holder in terms of positional adjustment or support of a flat screen monitor is not intended to be limiting to specific devices but is rather intended to generally describe the ability of the accessory holder of the invention to be used with a wide variety of devices.

Figure 1:
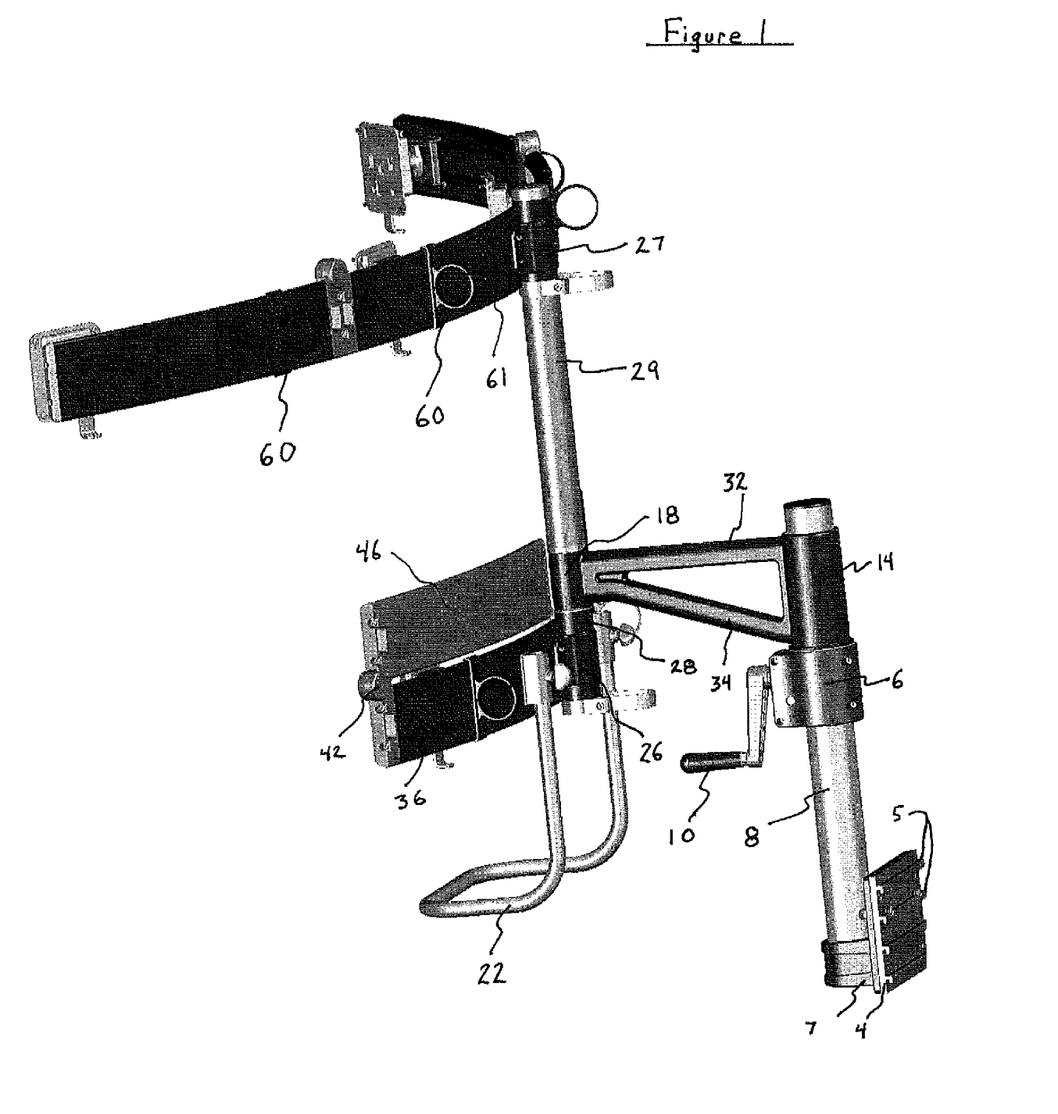
FIG. 1 is an illustration showing a side view of one embodiment of the invention.
Figure 7:
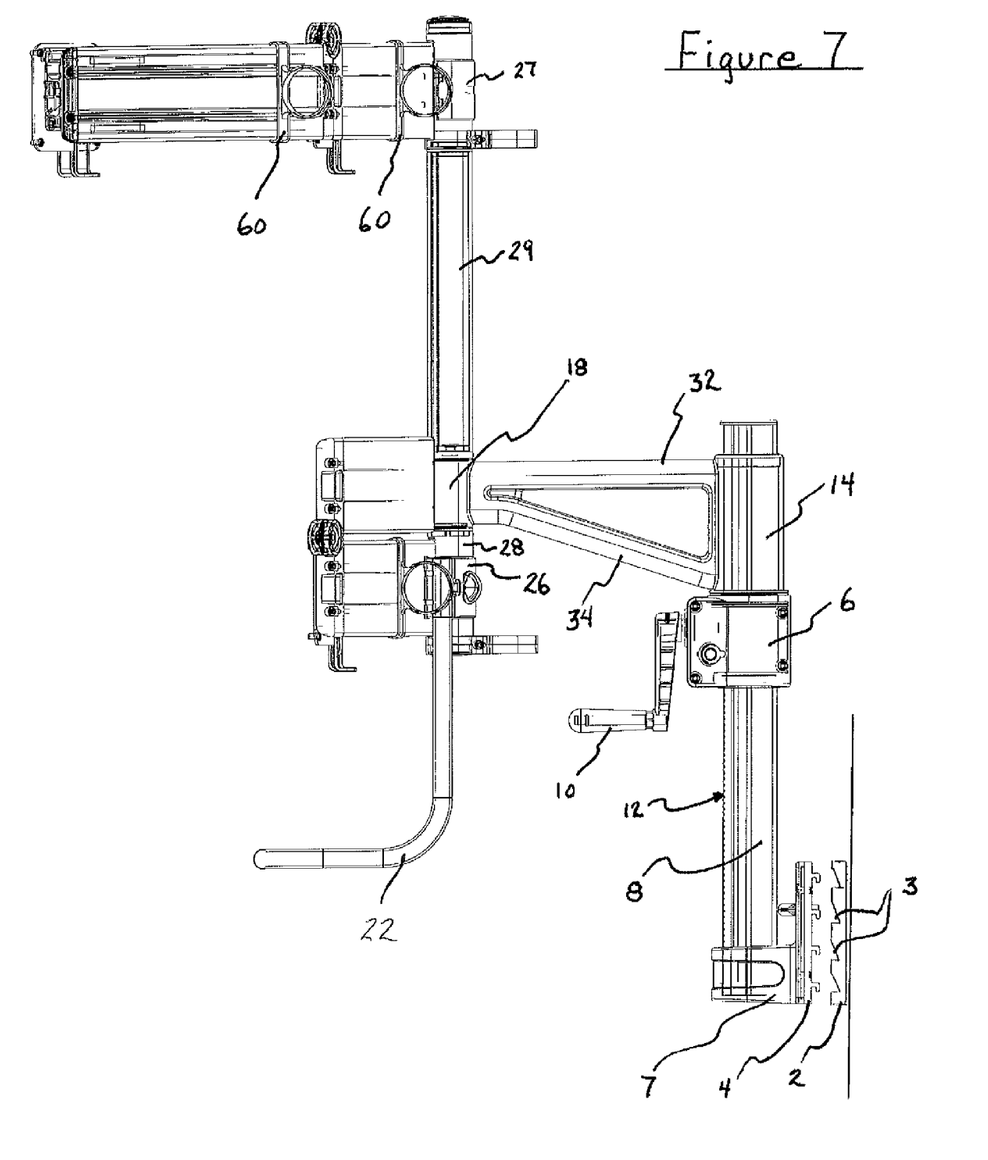
FIG. 7 is an illustration showing a side view of one embodiment of the invention.

FIGS. 1 and 7 are illustrations of a first embodiment of the accessory holder. Typically, these types of accessory holders are positioned above desks in an office or home office environment. The accessory holder will be mounted to a wall, a track mounted on a wall, the desk, or some other structurally secure object. In this first embodiment, the accessory holder is mounted to a track attached to a wall. Specifically, a wall track 2 (see FIG. 7) is mounted to a wall and mounting plate 4 is attached to wall track 2. Preferably, the wall track 2 is approximately three-quarters inches in depth and has horizontal channels 3 along its length. It is preferably bolted to a wall. The mounting plate 4 is preferably flat on one side and has horizontal ribs on the opposite side. These horizontal ribs are positioned and dimensioned to be received by the horizontal channels 3 in the wall track 2 when the mounting plate 4 is attached. These ribs 5 provide additional support for the accessory holder. The mounting plate 4 can be fastened to the wall track 2 by any known fastening means of sufficient strength (e.g., screws or bolts). In an alternative embodiment, the mounting plate 4 just clips to the wall track 2 using a bracket (e.g., "L" shaped bracket). This embodiment may be realized by the horizontal channels 3 having a ridge that is received by a channel in the underside of the ribs 5, thereby allowing the mounting plate to be clipped on the track 2. Preferably, in this embodiment, the "L" shaped bracket may be adjusted to grip the horizontal channel 3 to prevent any movement of the mounting plate 4 relative to the wall track 2. In another embodiment the wall track is not used and the mounting plate is secured to the wall directly. Base 7 is attached to mounting plate 4. Preferably, base 7 is constructed of metal and is cylindrical in shape. Base 7 may be adapted to receive vertical pole 8, which may be frictionally secured in place. Vertical pole 8 is connected to base 7 at a proximal end and extends upward to a distal end. The vertical pole 8 is preferably constructed of metal and is cylindrical in shape. A gear rack 12 is attached to the vertical pole 8 and extends along its length from the proximal end to the distal end. The gear rack 12 is preferably a row of metal teeth dimensioned to be operatively engaged to a gear. Hand crank 6 surrounds vertical pole 8 and at its lowest position is on top of and adjacent to base 7. Hand crank 6 is well known in the machining tools art and has been used in the industry to adjust the height of a drill press. The hand crank 6 comprises a handle 10 operatively connected to internal gears (not shown). The internal gears are operatively engaged with the gear rack 12 on the vertical pole 8 as is well known in the industry. Further, as is well known in the industry, in a preferred embodiment, the internal gears include a worm gear. The worm gear prevents the gears from moving unless hand crank handle 10 is turned. A hand crank sleeve 14 surrounds a portion of the vertical pole 8 and is connected to the top of hand crank 6. Preferably, a bushing is interposed between vertical pole 8 and hand crank sleeve 14. The bushing ensures a tight fit and allows for a smoother rotating motion. An arm extends horizontally from the hand crank sleeve 14. The arm can be in any configuration that can support the weight of the accessory holder and the accessories. Preferably, the arm comprises an upper support arm 32 and a lower support arm 34 that forms a triangular shape with the hand crank sleeve 14. Specifically, the upper support arm 32 extends horizontally from the hand crank sleeve 14 and the lower support arm 34 extends at an upward angle from the hand crank sleeve 14 at a position below the upper support arm 32. The upper support arm 32 and lower support arm 34 are connected at a distal end where they are connected to shaft sleeve 18. Shaft sleeve 18 surrounds shaft 28. Shaft 28 extends down from shaft sleeve 18 and is attached to crossbar bracket 26. A thrust bearing may be interposed between the crossbar bracket 26 and the shaft sleeve 18. The thrust bearing can be of the ball or barrel type thrust bearing or any other type of thrust bearing known in the art.

In an alternative embodiment, the accessory holder can be vertically adjusted by a gas cylinder adjustment means instead of or in conjunction with the hand crank 6. Gas cylinders provide controlled and smooth lifting assistance for height adjustment. The use of gas cylinders to vertically adjust the accessory holder according to the present invention is advantageous because various gas cylinders can be employed to make the accessory holder adaptable to a number of different devices of different weights and sizes. Various compression gas cylinders are available allowing the present invention to be customized based on the use of gas cylinders having different stroke lengths and different weight ratings.

In another alternative embodiment, the handle 10 can be replaced with a motor operatively connected to the hand crank 6. The invention would operate in the same manner as the embodiment with the handle, except that the user would just turn on the motor and the motor would rotate the gears as if the user was rotating the handle 10. Preferably, the motor could be turned on in the forward or reverse direction so that the accessory holder could be lowered or raised.

In a further alternative embodiment, hand crank 6 includes an elongated portion which forms an inner sleeve which surrounds the vertical pole 8. Sleeve 14 then surrounds and rotates around the inner sleeve. Preferably, the sleeve 14 would be supported by a thrust bearing or ball bearings at the point of contact between the bottom of the sleeve 14 and the hand crank 6.

Figure 2:
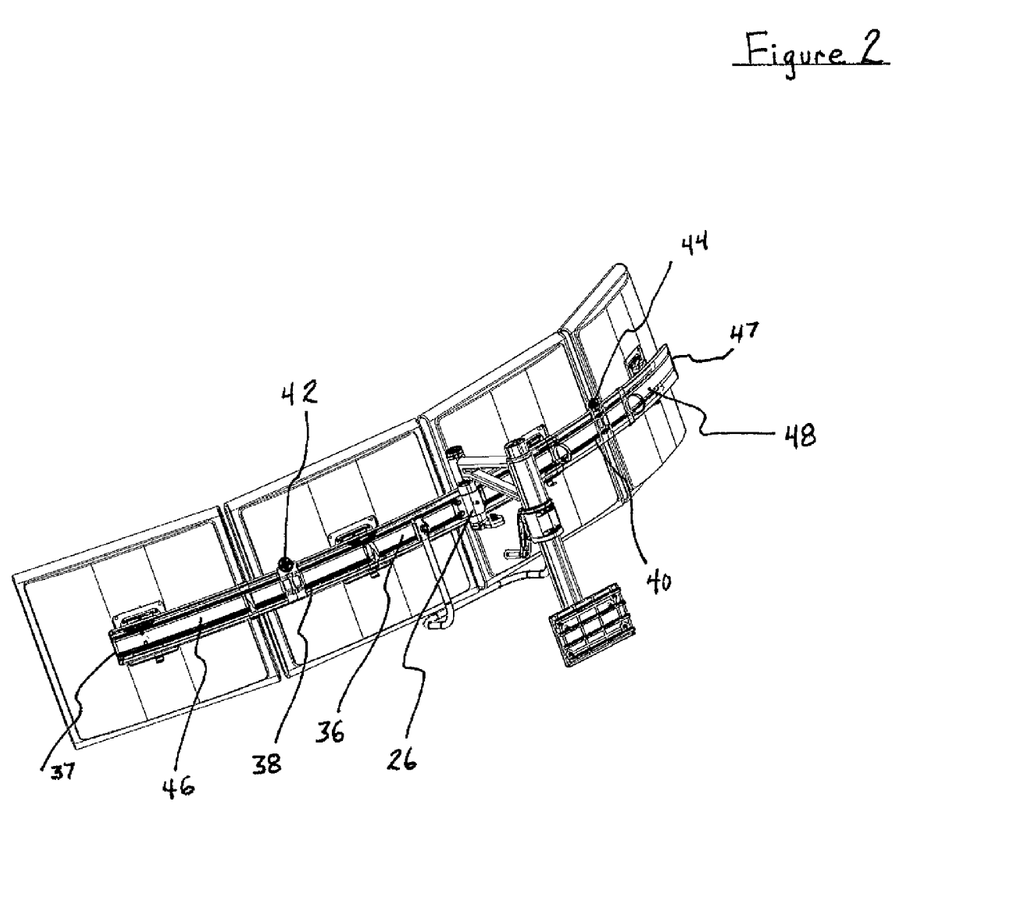
FIG. 2 is an illustration showing a rear view of an embodiment of the invention.

Referring to FIGS. 1 and 2, the crossbar bracket 26 is connected to the approximate center of central track 36. Central track 36 can be curvilinear or straight and preferably is rectangular in shape. The central track 36 has two distal ends 38, 40. The distal ends 38, 40 are attached to linkage mechanisms 42, 44, respectively. The linkage mechanisms are well known in the art and are essentially pivot points for movement of the wing tracks 46, 48 with respect to the central track 36. Preferably, the tracks 36, 46, 48 are curvilinear so that each of the accessories is approximately at an equal distance from the user. The user, therefore, will not need to focus and re-focus on accessories that are at varying distances. This not only saves time by not having to re-focus, but also relieves stress on the user's eyes. In addition, the user can maintain optimal sitting posture without the need to lean forward or back to view the accessory at an appropriate distance. The curvilinear track shape also allows the accessories to directly face the user. This reduces glare and improves the viewing clarity, thereby, further reducing stress on the user's eyes and body.

Figure 3:
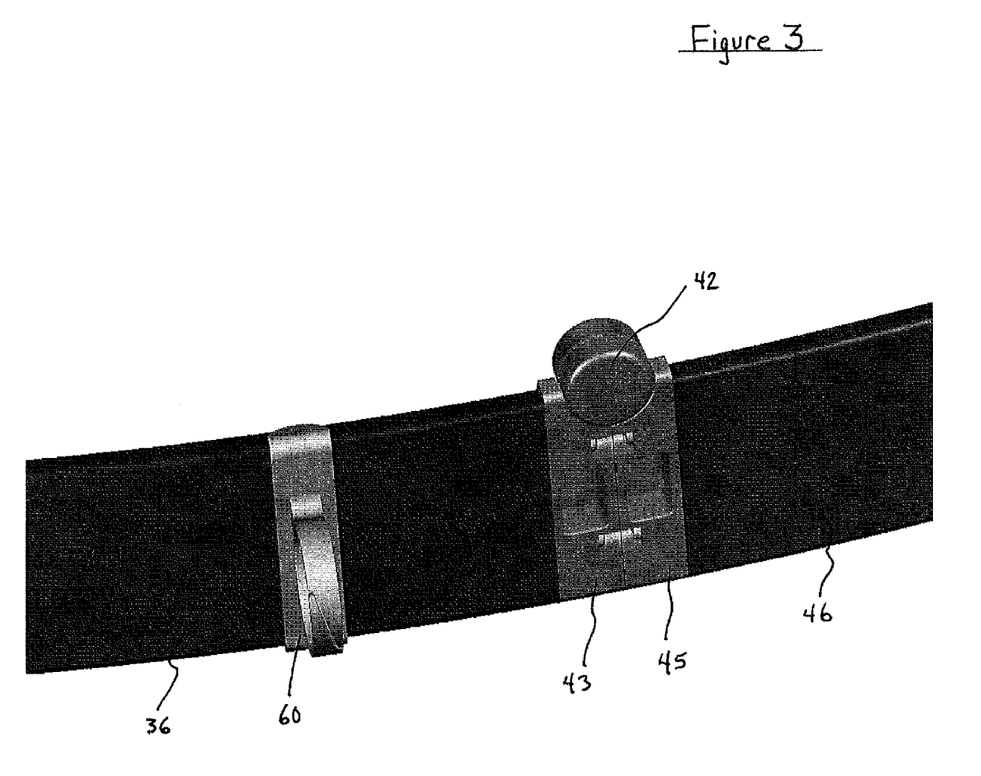
FIG. 3 is a blown up view of a track in an embodiment of the invention.

FIG. 3 shows a blown-up view of linkage mechanism 42 rotatably attaching central track 36 and wing track 46. The linkage mechanisms 42, 44 are attached to wing tracks 46, 48, respectively. The linkage mechanisms 42, 44 hold the wing tracks 46, 48 as continuous extensions of the central track 36. The wing tracks 46, 48 can be folded on top of the central track 36 by rotating linkage mechanisms 42, 44.

Figure 4:
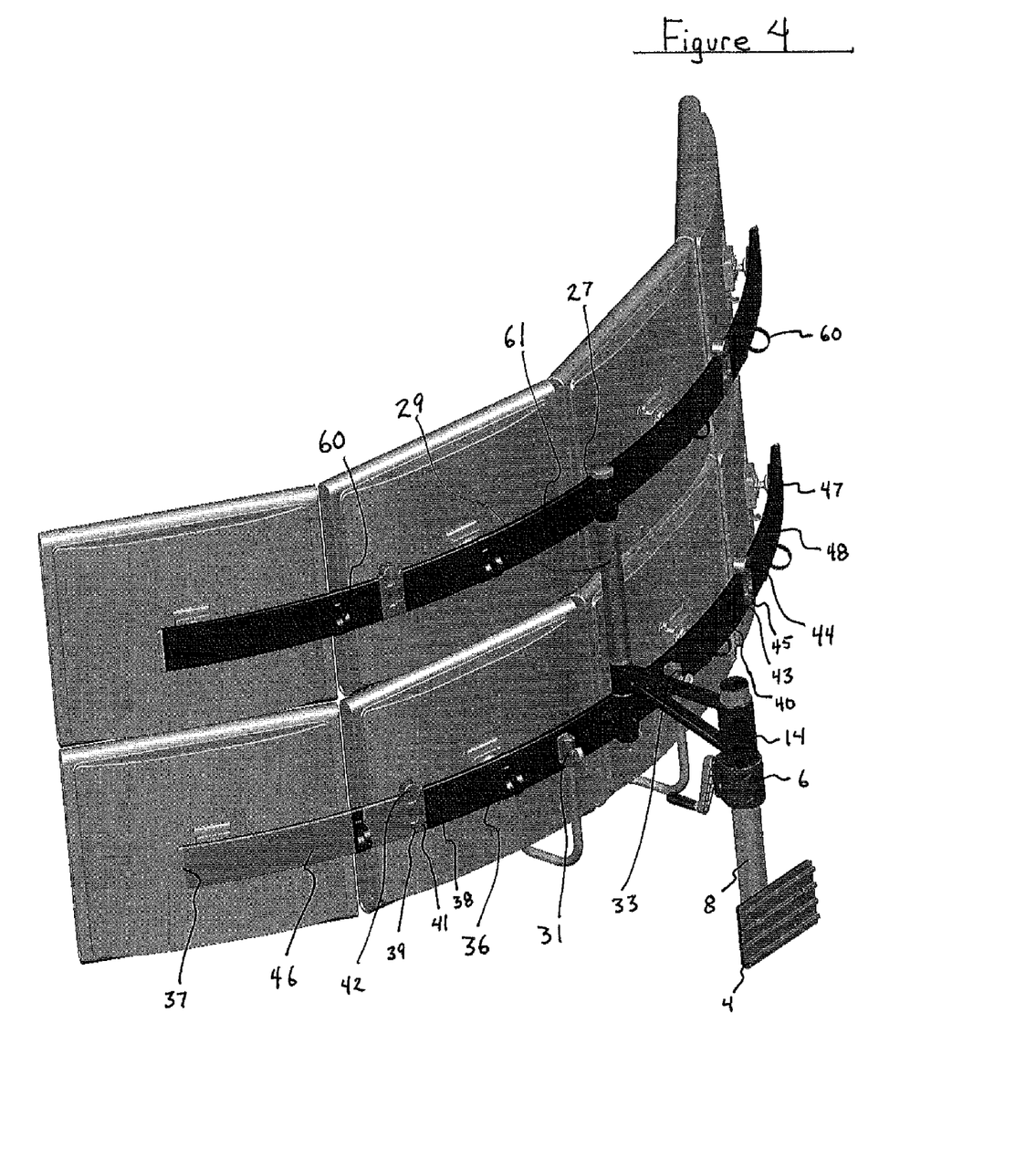
FIG. 4 is a rear view of an embodiment of the invention.
Figure 5:
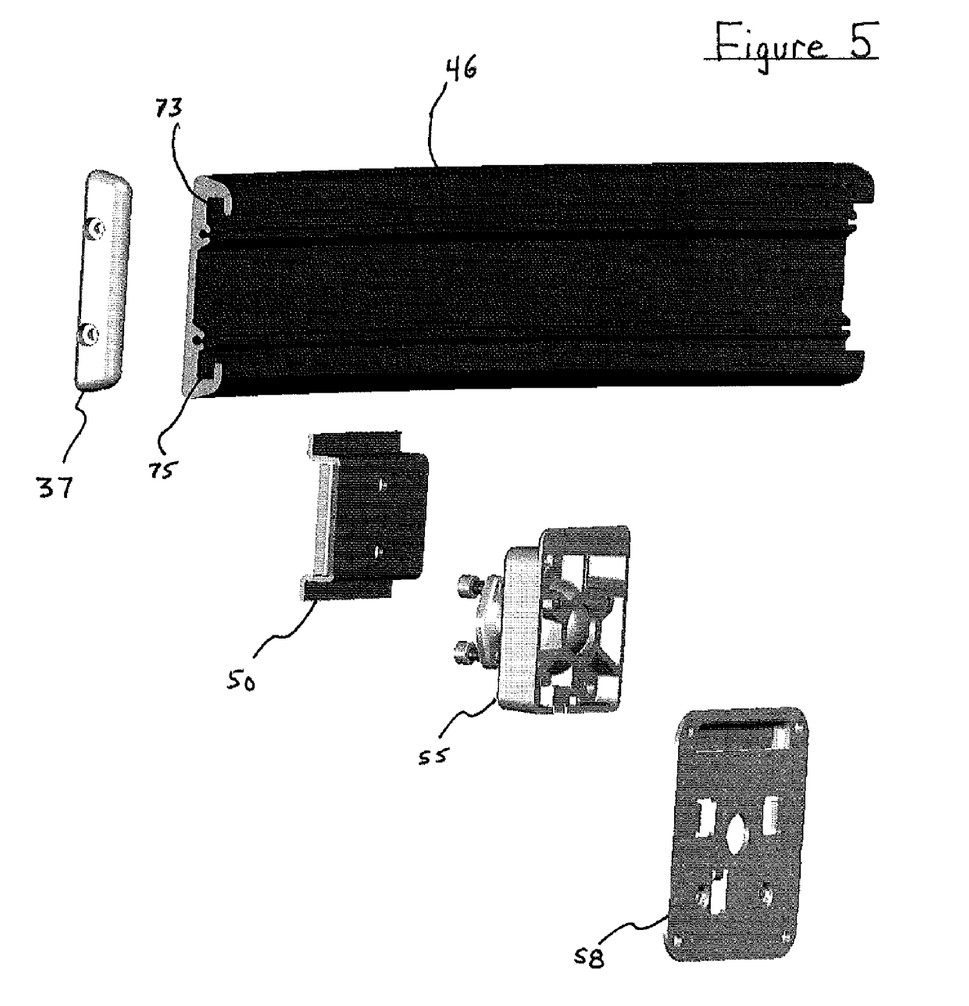
FIG. 5 is an exploded front view of a track and attachments used in one embodiment of the invention.

Referring to FIGS. 4 and 5, a plurality of support attachment brackets 50 can be slidably attached to the central track 36 and wing tracks 46, 48. Preferably, the tracks 36, 46, 48 have removable end caps 37, 39, 41, 43, 45, 47. The end caps can be snap fit in place and can be removed to slide out the support attachment brackets 50. In a preferred embodiment, the central track 36 has two support attachment brackets 50 and the wing tracks 46, 48 have one support attachment bracket 50 apiece. To facilitate the free movement of the support attachment brackets 50 through the tracks 36, 46, 48, the invention may use friction reducers (track glides), which fit over the outer edges of the support attachment brackets 50, acting as a buffer between the support attachment brackets 50 and the track channels 73, 75. Desirably, the track glides comprise a low friction material, or are coated with a low friction material, such as polytetrafluorethylene (PTFE), Teflon™, polyethylene, fluorinated ethylenepropylene copolymer (FEP), perfluoroalkoxy (PFA), or the like. Other methods for facilitating the movement of the support attachment brackets 50 along the track channels 73, 75 are also encompassed by the present invention. For example, the outer edges of the support attachment brackets 50 could be equipped with bearings for allowing roller movement through the track channels 73, 75. Further friction reducing agents could also be used with the various embodiments of the invention. For example, lubricants could be used in the track channels 73, 75 to further facilitate free movement of the support attachment brackets 50 along the tracks 36, 46, 48.

In operation, turning handle 10 causes the internal hand crank gears to turn and either move up or down on the gear rack 12. Thereby, moving the hand crank 6 up or down the vertical pole 8. As the hand crank 6 is moved up or down, the crossbar bracket 26 also moves up or down. This allows a user to move the entire accessory holder up or down with a single hand by simply rotating handle 10. The individual accessories can then be moved side-to-side by sliding them along the track.

A grip 22 is attached to the grip brackets 31, 33. Grip 22 is preferably a loop type metal handle. Grip brackets 31, 33 are connected to central track 36. Grip 22 provides a convenient handle for a user to adjust the position of the accessory holder. That is, the user can move the accessories forward (to be closer to a user) and rearward (to be farther away from the user).

In operation, in the embodiment of FIG. 4, a user grabs hold of grip 22 and either pulls forward or pushes rearward. The force exerted by the user will cause the hand crank sleeve 14 to rotate around the vertical pole 8 and the shaft sleeve 18 to rotate around shaft 28. This simple procedure enables different users to personalize the accessory positions quickly and easily and ensures proper sitting posture for all users.

In operation, after the user sets the height (e.g., by using the hand crank 6) and depth (e.g., by using the grip 22) of the accessory holder, the user can further adjust the position of each individual accessory to place them in an optimal position. The accessory can be adjusted side to side by sliding support bracket attachment 50 along tracks 36, 46 or 48. The user can then adjust the orientation and tilt of the accessory simply by applying pressure to the appropriate portion of the accessory. Referring to FIG. 5, the accessory mounting bracket 58 is connected to ball joint 55 and ball joint 55 is connected to support attachment bracket 50.

In a preferred embodiment according to the present invention, accessory mounting bracket 58 is VESA® compliant. The Video Electronics Standards Association (VESA®) is an organization of technology based companies proposing standards for the video electronics market. One standard for mounting attachment of video displays is the VESA® Flat Display Monitor Interface standard or VESA®FDMI™. The VESA® FDMI™ Standard defines mounting interfaces, hole patterns, and associated cable/power supply locations for LCD monitors, plasma displays and other flat panel devices. Under this standard, VESA® compliant video displays are equipped with either a 75×75 mm mounting hole pattern or a 100×100 mm mounting hole pattern. Further, VESA® compliant mounting patterns may be found on other types of devices that could also be beneficially attached to the FEA mechanism of the invention for improving ergonomy related to vertical positioning of the attached device.

The central track 36 and wing tracks 46, 48 can include cable management clips 60 along their length to hold the power, data, and other cables. Preferably, the cable management clips 60 comprise two molded plastic arms that are connected at a common proximal point and touch each other at a distal point—forming a complete circle. The arms can be separated to insert power, data, and other cables and then the arms will return to their original shape to close the circle and hold the power, data, and other cables. The cable management clips are removably attached and in a preferred embodiment are snap-fit in place.

Referring again to FIGS. 1 and 4, an alternative embodiment that provides for a second row of accessories is shown. Shaft 29 extends upward from shaft sleeve 18 to allow for a second row of accessories to be supported. Shaft 29 is attached to crossbar bracket 27. The crossbar bracket 27 is connected to the approximate center of upper central track 61. The shaft 29 can be extended further to allow for a third, fourth, and additional rows of accessories limited only by the ability of the structure to support the additional weight. In a preferred embodiment, the accessory holder holds two rows of four accessories for a total of eight accessories.

The accessory holder of the present invention is further adaptable to use in different settings, and with a variety of devices, in that the accessory holder can be made in a variety of lengths to provide various ranges of adjustment.

As would be readily envisioned by one of skill in the art, the various mechanisms described herein are particularly useful in combination for providing functional, attractive support mechanisms that allow for easy position adjustment of attached devices. All combinations of the multiple mechanisms described herein are therefore encompassed by the present invention.

Preferentially, the various components of the present invention are constructed generally out of a strong, lightweight material, such as aluminum. Various different materials could also be used, such as other metals or plastics.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. An accessory holder comprising:
   a. a support means;
   b. a curvilinear central track attached to the support means;
   c. at least one support attachment bracket slidably attached to the track;
   d. at least one accessory mounting bracket attached to the at least one support attachment bracket, the accessory mounting bracket being adapted to be removably attached to an accessory;
   e. at least one wing track; and
   f. a linkage mechanism pivotally attaching the wing track to a distal end of the central track such that the wing track is capable of pivoting in the vertical plane to fold on top of the central track.

2. The accessory holder of claim 1, wherein the support means comprises:
   a. a mounting means;
   b. a vertical support attached to the mounting means;
   c. a height adjustment means operatively engaged to the vertical support; and
   d. a track support means connected to the height adjustment means, the track support means being adapted to be attached to the track.

3. The accessory holder of claim 2, wherein the height adjustment means comprises:
   a. a height controller;
   b. an arm extending from the vertical support to a distal end, the arm's height being controlled by the height controller, the arm being rotatably attached to the vertical support; and
   c. the distal end of the arm being rotatably attached to the track support means.

4. The accessory holder of claim 3, wherein the arm comprises:
   a. a sleeve surrounding the vertical support, the sleeve being capable of rotating around the vertical support, the sleeve being operably engaged to the height controller;
   b. an upper post extending substantially horizontally from the sleeve to a distal end; and
   c. a lower post extending from the sleeve at an upward angle to an intersection with the upper post.

5. The accessory holder of claim 3, wherein the track support means further comprises:
   a. An upper vertical shaft having a distal end and a proximal end, the proximal end of the upper vertical shaft being attached to the distal end of the arm;
   b. an upper sleeve rotatably attached to the distal end of the upper vertical shaft; and
   c. an upper track attached to the upper sleeve.

6. The accessory holder of claim 3, wherein the height controller comprises:
   a. a gear rack attached to the vertical support;
   b. at least one gear operatively engaged with the gear rack; and
   c. a handle attached to the at least one gear, wherein rotating the handle rotates the at least one gear.

7. The accessory holder of claim 3, wherein the height controller comprises:
   a. a gear rack attached to the vertical support;
   b. at least one gear operatively engaged with the gear rack; and
   c. a motor attached to the at least one gear, wherein rotating the motor rotates the at least one gear.

8. The accessory holder of claim 3, wherein the height controller comprises:
   a. a housing supporting a gear rack along its length;
   b. a skate slidably attached to the housing;
   c. at least one gas cylinder attached to the skate;
   d. at least one gas cylinder actuator attached to the at least one gas cylinder;
   e. a gear box having at least one gear operatively engaged to the gear rack, the gear box attached to the skate; and
   f. a knob attached to the at least one gear.

9. The accessory holder of claim 2, wherein the height controller comprises:
   a. a gear rack attached to the vertical support;
   b. at least one gear operatively engaged with the gear rack; and
   c. a handle attached to the at least one gear, wherein rotating the handle rotates the at least one gear.

10. The accessory holder of claim 2, wherein the height controller comprises:
    a. a gear rack attached to the vertical support;
    b. at least one gear operatively engaged with the gear rack; and
    c. a motor attached to the at least one gear, wherein rotating the motor rotates the at least one gear.

11. The accessory holder of claim 9, wherein the track support means further comprises:
    a. An upper vertical shaft having a distal end and a proximal end, the proximal end of the upper vertical shaft being attached to the distal end of the arm;
    b. an upper sleeve rotatably attached to the distal end of the upper vertical shaft; and
    c. an upper track attached to the upper sleeve.

12. The accessory holder of claim 2, wherein the height controller comprises:
    a. a housing supporting a gear rack along its length;
    b. a skate slidably attached to the housing;
    c. at least one gas cylinder attached to the skate;
    d. at least one gas cylinder actuator attached to the at least one gas cylinder;
    e. a gear box having at least one gear operatively engaged to the gear rack, the gear box attached to the skate; and
    f. a knob attached to the at least one gear.

13. The accessory holder of claim 12, wherein the track support means further comprises:
    a. An upper vertical shaft having a distal end and a proximal end, the proximal end of the upper vertical shaft being attached to the distal end of the arm;
    b. an upper sleeve rotatably attached to the distal end of the upper vertical shaft; and
    c. an upper track attached to the upper sleeve.

14. The accessory holder of claim 2, wherein the track support means further comprises:
    a. An upper vertical shaft having a distal end and a proximal end, the proximal end of the upper vertical shaft being attached to the distal end of the arm;
    b. an upper sleeve rotatably attached to the distal end of the upper vertical shaft; and
    c. an upper track attached to the upper sleeve.

15. The accessory holder of claim 2, wherein the mounting means comprises a wall mount, the wall mount having a plate through which mechanical fasteners can be inserted into a wall.

16. The accessory holder of claim 2, wherein the mounting means comprises:
    a. a receiving member attached to a desk and adapted to receive a connecting member; and
    b. a connecting member attached to the height adjustment means.

17. The accessory holder of claim 2, wherein the mounting means comprises a mounting plate attached to the vertical support and a wall track attached to a wall, the wall track adapted to be removably attached to the mounting plate.

18. The accessory holder of claim 2, wherein the mounting means comprises a desk mount, the desk mount comprising:
    a. a desktop;
    b. a receiving member attached to the desktop and adapted to receive a connecting member; and
    c. a connecting member attached to the height adjustment means.

19. The accessory holder of claim 1, wherein the track is shaped so that each of the accessories is positioned equidistant from a user.

20. The accessory holder of claim 1, wherein the track is shaped so that each of the accessories is positioned to face a user.

21. The accessory holder of claim 1, wherein the wing track can fold flush with the central track when a monitor is not attached to the wing track.

22. The accessory holder of claim 1, further comprising a grip attached to the central track, whereby a user can move said central track forward and rearward by exerting force on said grip.

23. The accessory holder of claim 6, wherein the track support means further comprises:
    a. An upper vertical shaft having a distal end and a proximal end, the proximal end of the upper vertical shaft being attached to the distal end of the arm;
    b. an upper sleeve rotatably attached to the distal end of the upper vertical shaft; and
    c. an upper track attached to the upper sleeve.

24. An accessory holder comprising:
    a. a support means;
    b. a central track attached to the support means;
    c. a wing track;
    d. a linkage mechanism pivotally attaching the wing track to a distal end of the central track, the linkage mechanism comprising a vertical pivot joint, wherein the wing track is capable of pivoting in the vertical plane about the vertical pivot joint to fold on top of the central track; and
    e. at least one support attachment bracket attached to one of the central track or the wing track.

25. The accessory holder of claim 24, wherein the support means comprises:
    a. a mounting means;
    b. a vertical support attached to the mounting means;
    c. a height adjustment means operatively engaged to the vertical support means; and
    d. a track support means connected to the height adjustment means, the track support being adapted to be attached to a track.

26. The accessory holder of claim 25, wherein the height adjustment means comprises:
   a. a height controller;
   b. an arm extending from the vertical support to a distal end, the arm's height being controlled by the height controller, the arm being rotatably attached to the vertical support; and
   c. the distal end of the arm being rotatably attached to the track support means.

27. The accessory holder of claim 26, wherein the arm comprises:
   a. a sleeve surrounding the vertical support, the sleeve being capable of rotating around the vertical support, the sleeve being operably engaged to the height controller;
   b. an upper post extending substantially horizontally from the sleeve to a distal end; and
   c. a lower post extending from the sleeve at an upward angle to an intersection with the upper post.

28. The accessory holder of claim 26, wherein the track support means further comprises:
   a. An upper vertical shaft having a distal end and a proximal end, the proximal end of the upper vertical shaft being attached to the distal end of the arm;
   b. an upper sleeve rotatably attached to the distal end of the upper vertical shaft; and
   c. an upper track attached to the upper sleeve.

29. The accessory holder of claim 26, wherein the height controller comprises:
   a. a gear rack attached to the vertical support;
   b. at least one gear operatively engaged with the gear rack; and
   c. a handle attached to the at least one gear, wherein rotating the handle rotates the at least one gear.

30. The accessory holder of claim 26, wherein the height controller comprises:
   a. a gear rack attached to the vertical support;
   b. at least one gear operatively engaged with the gear rack; and
   c. a motor attached to the at least one gear, wherein rotating the motor rotates the at least one gear.

31. The accessory holder of claim 26, wherein the height controller comprises:
   a. a housing supporting a gear rack along its length;
   b. a skate slidably attached to the housing;
   c. at least one gas cylinder attached to the skate;
   d. at least one gas cylinder actuator attached to the at least one gas cylinder;
   e. a gear box having at least one gear operatively engaged to the gear rack, the gear box attached to the skate; and
   f. a knob attached to the at least one gear.

32. The accessory holder of claim 29, wherein the track support means further comprises:
   a. An upper vertical shaft having a distal end and a proximal end, the proximal end of the upper vertical shaft being attached to the distal end of the arm;
   b. an upper sleeve rotatably attached to the distal end of the upper vertical shaft; and
   c. an upper track attached to the upper sleeve.

33. The accessory holder of claim 25, wherein the track support means further comprises:
   a. An upper vertical shaft having a distal end and a proximal end, the proximal end of the upper vertical shaft being attached to the distal end of the arm;
   b. an upper sleeve rotatably attached to the distal end of the upper vertical shaft; and
   c. an upper track attached to the upper sleeve.

34. The accessory holder of claim 25, wherein the mounting means comprises a wall mount, the wall mount having a plate through which mechanical fasteners can be inserted into a wall.

35. The accessory holder of claim 25, wherein the mounting means comprises a desk mount, the desk mount comprising:
   a. a desktop;
   b. a receiving member attached to the desk and adapted to receive a connecting member; and
   c. a connecting member attached to the height adjustment means.

36. The accessory holder of claim 25, wherein the mounting means comprises a mounting plate attached to the vertical support and a wall track attached to a wall, the wall track adapted to be removably attached to the mounting plate.

37. An accessory holder comprising:
   a. a mount attached to a structure;
   b. a base attached to the mount;
   c. a substantially circular cylinder attached to the base at a proximal end, the circular cylinder having a distal end;
   d. a gear rack along the vertical length of the substantially circular cylinder;
   e. a hand crank housing movably attached to the substantially circular cylinder;
   f. a gear movably attached to the hand crank housing and operably engaged with the gear rack;
   g. a handle attached to the gear;
   h. an offset arm movably attached at a proximal end to the substantially circular cylinder and attached to the hand crank housing, the offset arm extending from the substantially circular cylinder, the offset arm having a distal end;
   i. a central track rotatably attached to the distal end of the offset arm, the track being curvilinear;
   j. at least one wing track pivotally attached to a distal end of the central track, wherein the wing track is capable of pivoting in the vertical plane to fold on top of the central track;
   k. at least one glider slidably attached to a track; and
   l. at least one accessory mounting bracket movably attached to the at least one support attachment bracket, the accessory mounting bracket being adapted to be removably attached to an accessory.

* * * * *